July 12, 1960
T. J. OCHELLO ET AL
2,944,277
SIDE-MOUNTED REAR VIEW MIRROR FOR VEHICLES HAVING WIPER MEANS THEREON
Filed Jan. 31, 1958
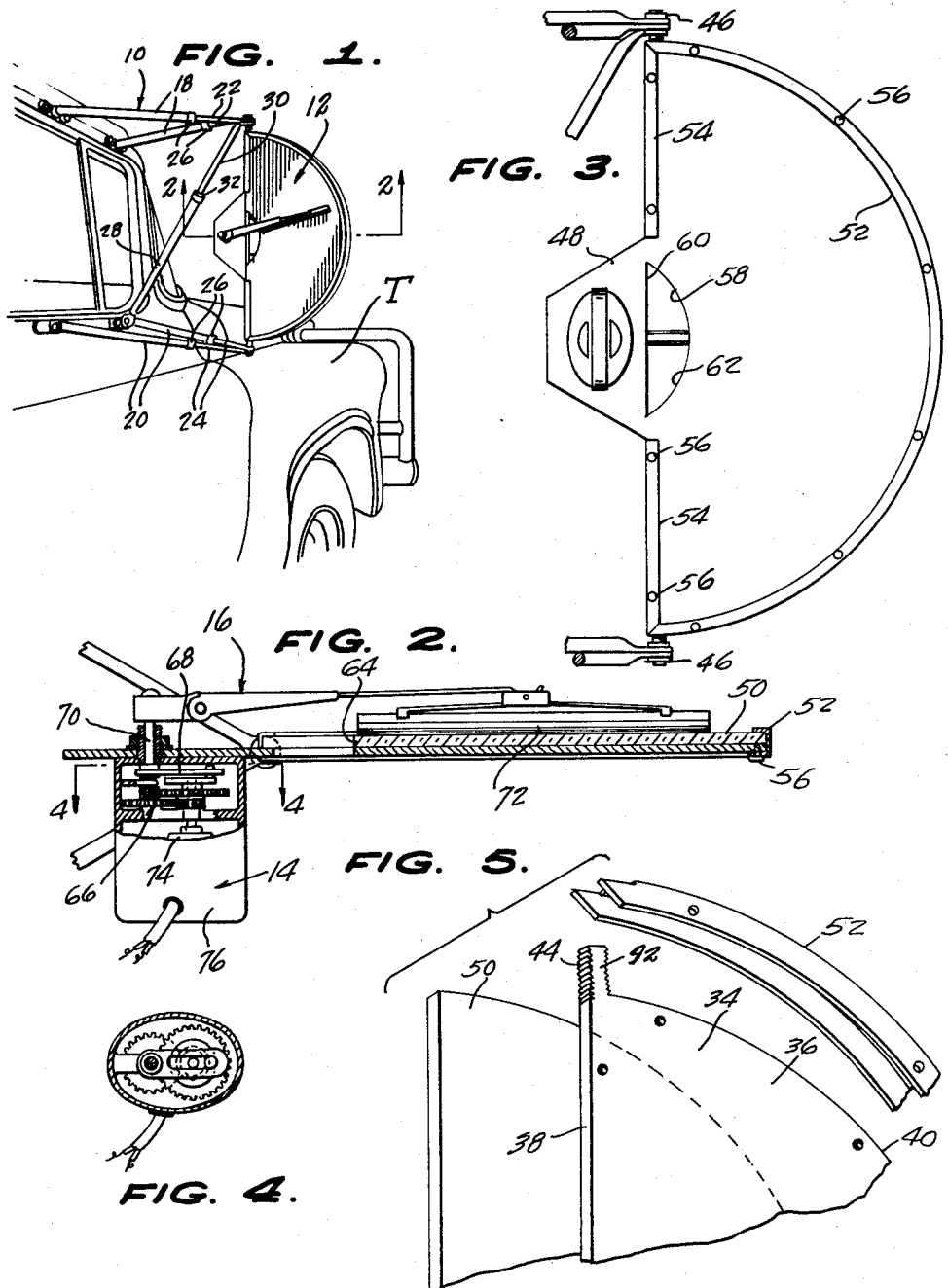
INVENTORS.
THOMAS J. OCHELLO,
THOMAS J. OCHELLO,
BY
McMorrow, Berman + Davidson
ATTORNEYS.

2,944,277
SIDE-MOUNTED REAR VIEW MIRROR FOR VEHICLES HAVING WIPER MEANS THEREON

Thomas J. Ochello, 223 Oak Drive, and Thomas J. Ochello, 904 Ehret Road, both of Marrero, La.

Filed Jan. 31, 1958, Ser. No. 712,513

1 Claim. (Cl. 15—250.3)

This invention relates generally to rear view mirrors for vehicles, and more particularly has reference to a mirror assembly of the side-mounted type, that is, the type that is mounted upon an arm structure projecting laterally outwardly from a side of the vehicle, rather than being mounted directly within the passenger compartment of the vehicle.

Side-mounted rear view mirror assemblies are used, of course, almost universally on vehicles, and are, in fact, a necessity on trucks, since it is usually impossible for the truck operator to have any vision through the rear of his vehicle.

Since these mirrors are completedly exposed to the elements, they tend to become clouded with frost, or alternatively, during rain storms, water tends to run over the surface of the mirror, so as to cut down appreciably on the amount of vision that can be had therewith.

It has been heretofore proposed, broadly, to provide a wiper upon a rear view mirror, and the main object of the present invention is to provide an improved, novel construction for a mirror assembly having a wiper means thereon, the construction of the present invention being designed to facilitate the use of readily obtainable components.

Another important object is to provide a mirror assembly having a wiper means associated therewith, which assembly will have a particular shape, and a large area, designed to improve measurably the visibility of the following traffic which may be had by means of the mirror.

Another object is to so shape the mirror that a windshield wiper traversing the same in an oscillating motion may clean almost the full area of the mirror, leaving practically no portions of the surface thereof that are not traversed by the wiper.

Another object is to provide a device of the character stated that will permit the mounting of the wiper in a manner designed to permit the wiper to traverse its usual arcuate path, such as it would follow if it were mounted upon a vehicle in position to wipe the windshield of the vehicle. In other words, the invention is designed to make use of a wiper arm and blade, and also a wiper motor and motion-translating driving connection, already known and in use on windshield wipers, thereby permitting manufacture of the device at a comparatively low cost.

Another object is to mount the wiper motor and the driving connection between the motor and the blade arm, in a position such that the motor is disposed wholly outside the reflective area of the mirror.

Still another object is to so locate the motor as to permit the same to be conveniently accessible from within the vehicle, so that in the event the motor has a switch directly on the casing thereof, said switch can be operated from within the vehicle without difficulty. However, the invention is intended to permit operation of a switch from within the passenger compartment of the vehicle, in a typical installation.

Another object is to provide a device of the character stated in which the mirror can be readily adjusted according to the desires of a particular user, without interference from the motor or wiper assembly, the wiper assembly and its motor being mounted for adjustment conjointly with the reflective panel of the mirror.

Another object is to provide a mirror as described that will have a novelly shaped backing or support plate for the reflective glass of the mirror, said plate having edges in registration with those of the reflective plate to permit ready attachment of the reflective panel to the backing plate, with the backing plate having a projection not provided on the reflective panel, said projection providing the area on which the motor of the wiper is mounted.

Other objects will appear from the following description, the claims appended thereto, and from the annexed drawing, in which like reference characters designate like parts throughout the several views, and wherein:

Figure 1 is a perspective view showing the device mounted upon a vehicle;

Figure 2 is an enlarged sectional view substantially on line 2—2 of Figure 1, on an enlarged scale;

Figure 3 is an enlarged elevational view of the mirror structure, a portion of the supporting frame being broken away, the mirror being seen from the back thereof;

Figure 4 is a sectional view substantially on line 4—4 of Figure 2; and

Figure 5 is a fragmentary perspective view on an enlarged scale of the mirror panel assembly.

Referring to the drawing in detail, the device constituting the present invention is adapted for mounting upon a truck T or similar vehicle, and may be considered as comprising certain main assemblies. These comprise a frame assembly generally designated 10; a panel assembly generally designated 12; a motor assembly generally designated 14 and including a motion-translating driving connection; and a wiper assembly generally designated 16.

The frame assembly includes laterally outwardly projecting upper arms 18 converging in a direction outwardly from the vehicle, and lower arms 20 also converging in a direction laterally outwardly from the vehicle. These may be secured at their inner, divergent ends fixedly to the vehicle door, in the regular manner.

The outer ends of the arms may be provided with telescoping extensions 22, 24 of the respective arms, permitting adjustment of the overall lengths of the arms, and said extensions may be contained in selected positions to which they are telescopically adjusted through the provision of threaded sleeves 26.

An inclined brace 28 has a telescopic extension 30 secured in selected positions of telescopic adjustment by a a nut or sleeve 32.

Referring now to the panel assembly 12, this includes a backing or support plate 34, having a body portion 36 of substantially semi-circular configuration and of large area. The body portion 36 has a vertical inner edge 38 and an arcuate outer edge 40 curved through 180°. Backing plate 36 is wholly planiform, and is formed of a suitably rigid, non-corrosive plate metal material or the like.

At the opposite extremities of the straight inside edge of the plate 34, there are integrally formed thereon outwardly projecting studs 42, which may be of non-circular cross section as shown, having discontinuous threads 44. The studs 42 extend through openings provided in the overlapped outer ends of the arm extensions 22, the extensions 30 of the brace, and (at the lower end of the backing plate) the overlapped extensions 24. Nuts 46 are then applied to secure the device in place. This provides for rotatable adjustment of the mirror panel assembly 12 about the axis defined by the coaxial studs 42, while still preventing wholly free rotational movement of the studs. In other words, there is a frictional engagement of the studs in the outer end of the support frame assembly, designed to permit rotatable adjustment of the mirror assembly to adjusted positions, while insuring that the mirror assembly will remain in any positions to which it is so adjusted.

In any event, intermediate the top and bottom ends of the backing plate, the backing plate is integrally formed with a laterally inwardly projecting, approximately trapezoidally shaped backing plate extension 48. The shape of this extension can of course be varied, but it is mainly important to note that said extension projects laterally inwardly out of the semi-circular body portion 36 of the backing plate.

The panel assembly 12 also includes a reflective panel member 50, which can be a conventional piece of mirrored glass. The panel member 50 is of semi-circular configuration, having a straight inside edge and an arcuate outside edge approximately registered with the corresponding edges of the backing plate. The reflective panel member 50 is secured to the backing plate in overlying relation thereto, through the provision of a plurality of channeled retaining flanges 52, 54. Retaining flange 52 is curved through 180°, and is in embracing relation to the arcuate edges of the backing plate and the reflective panel, being secured to the backing plate by means of screws 56.

The opposite ends of the retaining flange 52 are mitered, and the flanges 54 are complementarily mitered in abutting relation to the ends of flange 52.

Flanges 54 are straight, and are longitudinally aligned, above and below the projection 48. Additional screws 56 connect the flanges 54 to the backing plate in embracing relation to the backing plate and reflector panel 50.

An opening 58 is formed in the backing plate, at the base of the projection 48. Opening 58 has a straight edge 60 aligned with the straight edges 38, and has a curved edge 62 approximately concentric with the curved outer edge of the backing plate. The reflective panel 50, along its inside edge, has an arcuate recess 64 the edge of which is registered with the edge 62.

A motor 14 is conventional per se, and is used as a windshield wiper motor in conventional, windshield-mounted wiper installations. The motor illustrated is one sold under the trademark "American Bosch," being made by the American Bosch Motor Company of Springfield, Massachusetts.

It need not be described in detail hereinafter, accordingly, except to note that associated with the motor is a gear train generally designated at 66, said gear train transmitting motion from the shaft of the motor to a motion-translating driving connection 68 that translates rotary motion into an oscillating motion of the shaft 70 of a wiper arm assembly 16 of conventional design, having the blade 72 traversing substantially the entire area of the reflective panel 50.

As will be noted, the motor, which has been designated at 74, is enclosed in a casing 76, in which is enclosed also the motion-translating driving connection 68 shown to best advantage in Figure 4, as well as the gear train 66.

The driving means and driving connection generally designated at 14 are mounted upon the projection 48, completely outside the area of the reflective panel. This leaves an approximately semi-circular area of the reflective panel, which is shaped in the pattern traversed by the blade 72, during the normal oscillating movement of the blade.

A highly efficient construction thus results, wherein modification and redesign of the conventional blade assembly is kept to a minimum with said blade assembly traversing a substantial area, equal to that which it would traverse if mounted upon a windshield. At the same time, this area is of substantial size and is the area of the rear view mirror itself, providing increased visibility and assuring wiping of the full reflective area during operation of the vehicle.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claim.

What is claimed is:

For mounting upon a mirror support frame of a truck, a combination mirror and wiper unit comprising: a backing plate including a planiform, semi-circular body portion, coaxially aligned studs projecting outwardly from the respective ends of the body portion as longitudinal extensions of the straight side of the stud for mounting the backing plate upon a side view mirror support frame for pivotal movement about the common axis of the studs, and a lateral extension integrally formed upon the body portion at said straight side thereof and lying in a plane common to that of the body portion, said body portion and lateral extension having substantially their entire areas at respectively opposite sides of said common axis of the studs; a generally semi-circular reflective panel overlying and connected to the body portion; a motor mounted upon said lateral extension; a wiper blade supported at one end upon the extension for oscillating movement about an axis normal to said common axis of the studs, said blade overlying the panel in position to traverse the same when oscillated; and a driving connection between the motor and blade.

References Cited in the file of this patent

UNITED STATES PATENTS

| 1,625,700 | Block | Apr. 19, 1927 |
| 1,641,392 | Tippert | Sept. 6, 1927 |
| 1,700,777 | Sibley | Feb. 5, 1929 |
| 2,552,074 | Thompson | May 8, 1951 |
| 2,722,707 | Musselman | Nov. 8, 1955 |
| 2,737,852 | Porter et al. | Mar. 13, 1956 |
| 2,751,817 | Lapekas | June 26, 1956 |
| 2,807,985 | Beach | Oct. 1, 1957 |
| 2,814,823 | Werner | Dec. 3, 1957 |
| 2,860,546 | Bolser | Nov. 18, 1958 |
| 2,913,754 | Vander Zee | Nov. 24, 1959 |